Patented Oct. 22, 1935

2,018,065

UNITED STATES PATENT OFFICE 2,018,065

CATALYSTS

Vladimir Ipatieff, Chicago, Ill., assignor to Universal Oil Products Company, Chicago, Ill., a corporation of Delaware No Drawing. Application August 15, 1934, Serial No. 739,873

5 Claims. (Cl. 23—233)

This application is a continuation-in-part of my copending application Serial No. 678,933, filed July 3, 1933, Patent #1,993,513 issued Mar. 5, 1935.

This invention relates more particularly to the catalysts useful in accelerating various types of reactions among organic compounds.

In a more specific sense the invention has reference to composite catalytic materials which are employed in granular or powdered form and which may be used to accelerate reactions taking place in liquid phase, vapor phase or mixed liquid-vapor phase.

It is a noteworthy fact in any particular organic reaction involving decomposition of single compounds or the interaction of two or more compounds that many times the reaction velocity constants are of a low order under moderate conditions of temperature and pressure corresponding to a minimum of secondary or side reactions, these latter resulting in the alteration of the primary desired products. For different reactions catalysts of extremely variable character have been found empirically which accelerate the reactions sufficiently so that laboratory processes can be operated upon a commercial scale.

Very few rules have been evolved which enable the prediction of the catalytic activity of any substance in a given organic reaction or the selection of a particular substance for a particular reaction. Metals, metal oxides, metal salts, various acids and alkalies, and substances of an ordinarily inert character which furnish an absorbent contacting surface have been tried and in different instances have proven effective. The type of catalyst which characterizes the present invention is of an essentially acid character.

In one specific embodiment the present invention comprises catalysts for organic reactions composed essentially of acids of phosphorus and siliceous carrying or spacing materials of a porous and adsorptive character.

The essential ingredient of the solid catalysts which are employed in organic reactions according to the present invention is phosphoric acid, which may constitute 80% or more of the catalyst mixture, and in most cases is over 30% by weight thereof. Of the various acids of phosphorus, the orthophosphoric acid ($H_3PO_4$) finds general application on account of its polymerizing ability, its cheapness and the readiness with which it may be procured although the invention is not restricted to its use but may employ any of the other acids of phosphorus insofar as they are adaptable. It is not intended to infer, however, that the different acids of phosphorus which may be employed will produce identical effects upon any given organic reaction, as each acid will exert its own characteristic action.

In using orthophosphoric acid, different concentrations may be employed from approximately 75 to 100% or acid containing some free phosphorus pentoxide may even be used. Within these concentration ranges, the acids will be thick liquids of varying viscosity and readily incorporated with the absorbent materials. In practice it has been found that pyrophosphoric acid corresponding to the formula $H_4P_2O_7$ is readily incorporated with siliceous and relatively inert carriers at temperatures somewhat above its melting point (61° C.) and that the period of heating which is given to the acid-absorbent mixtures may be changed from that employed with the ortho acid. This point will be developed more in detail in a later paragraph.

The main feature of the present invention resides in the employment of ordinarily liquid phosphoric acids as catalysts for organic reactions in substantially solid form, this being accomplished by the alternative use of a number of different absorbent carrying materials which vary somewhat in their absorptive capacity and also in their chemical and physical properties and their influence upon the catalytic effect of the mixtures. The materials which may be employed are divisible roughly into two classes. The first class comprises materials of a predominately siliceous character and includes diatomaceous earth, kieselguhr and artificially prepared porous silica such as, for example, Sil-O-Cel. In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

The second class of materials which may be employed either alone or in conjunction with the first class (and with certain other optional ingredients to be later described) comprises generally certain members of the class of aluminum silicates and includes such naturally occurring substances as the various fuller's earths and clays such as bentonite, montmorillonite, etc. The class also includes certain artificially prepared aluminum silicates of which the product known as tonsil is representative, this substance being in a sense a purified aluminum silicate made by treating certain selected clays with sulphuric, hydrochloric or other mineral acid and washing out the reaction products. The naturally occurring substances in this general class are characterized by a high adsorptive capacity which is particularly in evidence in making up the present type of phosphoric acid catalyst, and they may also contain traces of active ingredients which may assist in producing the desired polymerizing effects. Again each silicate material which may be used alternatively will exert its own specific influence upon the net effectiveness of the catalyst composite which will not necessarily be identical with that of the other members of the class.

In some cases the structure of the solid phosphoric acid catalysts may be improved by the primary incorporation of organic materials which yield a carbonaceous residue on heating. Substances which may be used in this manner include such materials as cellulose, starches, sugars, glue, gelatin, flour, molasses, agar-agar, etc. They evidently function as binders to some extent to prevent the breakdown of the catalyst structure when subjected to elevated temperatures and the action of hydrocarbon vapors or liquids in service.

Catalysts of the character comprised within the scope of the present invention are producible by a series of relatively simple steps comprising generally: mixing a liquid phosphoric acid and adsorbent materials in selected proportions, heating at temperatures of approximately 180 to 220° C., and grinding and sizing the resultant product to produce particles of the desired size. The catalyst may be used in particle sizes of from approximately 4 to 20 mesh or may be made up into small briquettes. When carbonaceous materials are used somewhat higher temperatures may be employed to decompose them. The optimum temperature of heating when employing these materials varies considerably. Good results have been obtained at temperatures as high as 300° C., though in some instances it would appear that too high temperatures above this point have a deleterious effect. The exact maximum temperature employed in the calcining step will be to some extent a matter of trial.

By the term "calcined mixture" as used in the claims is meant a mixture comprising a phosphoric acid and a solid adsorbent which has been heated to a temperature adequate to render it solid. This is accomplished at least in part by expelling water.

When pyrophosphoric acid is employed in the original mixes the temperatures employed in the mixing step are commonly those comprised within the range of from 120 to 180° C. Within this temperature range the acid is sufficiently fluid to enable rapid mixing by mechanical devices. Such mixes may then be calcined at temperatures from approximately 180 to 300° C., without deleterious effect upon the structure, strength or catalytic efficiency of the particles finally produced. When starting with this acid and heating at the somewhat higher permissible temperatures the heating or calcining period may be reduced in some instances from 48 to 60 hours down to about 20 hours.

Catalysts of the present character are hygroscopic to a variable extent and are best ground, sized and preserved for use out of contact with moist air.

Owing to the possibility of varying both the active ingredients and the relatively inert absorbent materials which go to form the catalyst masses, a number of alternatives exist, each of which will have its own peculiar catalyzing character which will not be exactly equivalent to masses of different composition.

The present type of catalyst is particularly efficient in polymerizing normally gaseous olefins to produce polymers utilizable as good anti-knock constituents of motor fuel. In the gases from oil cracking plants there are substantial percentages of 3, 4 and 5 carbon atom hydrocarbons including propylene, butylenes, amylenes and some hexylenes (if the gases are wet) and by the use of solid phosphoric acid catalysts under properly selected conditions of temperature and pressure such olefins are polymerized principally to dimeric forms. The following table shows the approximate boiling points of the dimers of these olefins.

*Boiling points of olefin dimers*

| | |
|---|---|
| Hexylene | 155° F. |
| Octylene | 255° F. |
| Decylene | 323° F. |
| Dodecylene | 417° F. |

Of the lower boiling and normally gaseous olefins, ethylene is the most resistant to polymerization by catalysts of the present character, but in the presence of its higher homologs it is possible that a certain amount of mixed polymers are formed.

Polymers of higher molecular weight than the di- and tri-molecular compounds are generally of too high boiling point to be used in commercial gasolines and the end products of too extensive polymerization are resinous pitchy solids which are entirely unsuitable.

The polymerizing of gaseous olefins with catalysts of the present character may be brought about under numerous combinations of temperature and pressure, though the best results for any given pure olefin or mixture of olefins such as those encountered in the gases from oil cracking plants, will usually correspond to a particular set of conditions. It is a feature of the present type of catalyst that olefin polymerizing treatments may be conducted at temperatures as high as 250° C., and superatmospheric pressures up to several hundred pounds per square inch without danger of over-polymerization resulting in the formation of heavy tar-like polymers instead of liquids of gasoline boiling range.

In using the catalysts to polymerize gaseous olefins only simple equipment is necessary such as a tube or tower in which the catalyst is placed as a filling material. The gases may be pumped up to some given pressure and preheated to a suitable temperature prior to passage through the catalyst mass or the catalyst chamber may be heated externally if desired. A few test runs will usually determine the best conditions of operation. For example, if the temperatures and pressures employed are such that the products exist entirely in vapor phase, the flow of the gases through the catalyst may be upward through filled towers while if liquids are condensed, the best results may be obtained when down flows are used so that liquid does not accumulate on the surface of the catalyst.

Solid phosphoric acid catalysts are characterized by their ability to polymerize olefins to produce relatively low boiling hydrocarbon polymers rather than heavy tars or pitches and by their long life due to the absence of such highly carbonaceous reaction products and also due to lack of oxidizing tendency in the phosphoric acid which constitutes the major portion thereof. In contrast to this it is notable that when employing sulphuric acid as a polymerizing agent, caution is necessary to prevent oxidation and undesirable side reactions such as ester formation and that, when employing metal halides such as aluminum chloride or zinc chloride, the tendency toward the formation of heavy polymers is very pronounced, so that it is not possible to produce more than minor amounts of desired low boiling hydrocarbons without the concurrent production of large quantities of heavy materials. Furthermore, solid phosphoric acid catalysts are readily regenerated after they have been contaminated by surface carbon deposits after long periods of service by merely burning off the deposits with air or other oxidizing gas at moderate temperatures. A still further advantage resides in the fact that they are substantially of a non-corrosive character as compared with the decided corrosive action of liquid phosphoric acid and other liquid polymerizing agents. The peculiar structural strength of catalyst masses of the present type has already been noted but may be mentioned again in connection with the general advantages which they possess, this being of special commercial value.

With suitable modifications in the details of operation the present type of catalyst may be employed in a large number of organic reactions, including polymerization of olefins as already mentioned. In the following paragraphs some of these are enumerated though it is to be understood that the list of cases cited is not necessarily complete but merely illustrative.

One field of organic chemistry in which the present catalysts find application is in the alkylation of aromatic hydrocarbons by olefinic hydrocarbons to produce compounds of a mixed alkyl-aryl character. A reaction falling under this heating involves the formation of isopropyl benzol by the treatment of benzol with propylene according to the following reaction:

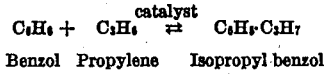

Benzol Propylene  Isopropyl benzol

In reactions of this character when using solid phosphoric acid catalyst the details of procedure will be modified in accordance with the phase of the reacting constituents. In one mode of operation the granules of catalyst occupy the interior of a vertical cylindrical treater and a mixture of benzol vapors and propylene in approximately equimolecular proportions is passed downwardly therethrough at suitably elevated temperature and pressure. Products from the bottom of the treator may be admitted directly to a fractionating column designed to separate the isopropyl benzol produced from the unreacted substances, which may then be returned to further contact with the catalyst until the reaction is substantially complete. Alkylation may proceed with the formation of more highly alkylated compounds by increasing the proportion of olefin and the time and temperature of the reaction.

The present type of catalyst has also been found effective in causing condensation reactions between either ethers or alcohols and aromatic hydrocarbons in which water is primarily split off to yield olefins which then follow essentially the type equation given above.

The catalysts may also be employed in the alkylation with olefins (or compounds yielding olefins on dehydration) of ring compounds containing substituent groups notably phenols, amines, etc. These reactions are frequently of importance commercially in improving the value of aromatic hydroxy compounds as inhibitors or antioxidants for use in various unstable compounds or mixtures such as, for example, cracked gasolines, unsaturated fatty acids, soaps, etc. By the alkylation of phenols, their inhibiting power is frequently materially increased and their solubility in water is generally decreased so that there is less likelihood of their being removed by accidental contacts with moisture during handling, treating or storage.

The present type of catalysts may also be employed in miscellaneous condensation reactions involving similar or dissimilar types of molecules. For example, they find application in the formation of condensation products by the interaction of phenols and aldehydes and phenols and ketones. They may also be employed effectively in ketone and aldehyde condensations.

By the use of the present type of catalysts unusually high yields of compounds formed by the direct addition of halogen acids and olefins have been obtained. For example, yields of over 85% of the theoretical have been produced when passing an equimolecular mixture of propylene and hydrochloric acid over granules of a solid phosphoric acid catalyst made up by the methods described in the foregoing paragraphs.

Phosphoric acid catalysts in essentially solid form are also effective in isomerization reactions. For example, various phenolic ethers are isomerizable to the corresponding alkylated phenols. Another instance of isomerization involving olefinic hydrocarbons is the transformation of isopropyl methylene to trimethyl ethylene which can be made to occur up to approximately 40 to 50% in a single pass over phosphoric acid catalyst particles at temperatures of from 400 to 500° C.

Another application of the present type of catalyst is found in the manufacture of acid esters from olefins and aliphatic carboxylic acids according to the following type reaction.

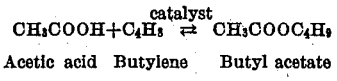

Acetic acid Butylene  Butyl acetate

The catalysts of the present character may be effectively employed in miscellaneous types of dehydration reactions upon aliphatic hydroxy compounds. For example, dioxane is producible from ethylene glycol when they are used as contact material. Ethyl alcohol is dehydrated to produce ethylene in the vapor phase and inversely ethylene may be hydrated to ethyl alcohol by using a comparatively large excess of steam with ethylene. The catalysts may also assist in the hydration of acetylene to produce acetaldehyde. Another dehydration reaction in which the catalyst may be employed is the production of butadiene from 1,3-butylene glycol.

A particular and important application of the present type of catalyst involves the treatment of cracked gasoline vapors. By using properly prepared and sized phosphoric acid-absorbent granules as filler in treating towers and temperatures and pressure common to the fractionators of cracking plants, say from 200 to 400° F., and 100–300 pounds per square inch, the olefinic constituents of these gas mixtures may be selectively polymerized either in one or several stages so that gum-forming olefins which would otherwise appear in the gasoline from the plant are converted to high boiling materials which are left behind as bottom reflux in the final fractionating step while a certain proportion of normally gaseous mono olefins present is polymerized to form gasoline boiling range liquids of superior anti-knock value so that both yield and quality of the gasoline from the cracking process is improved. It is characteristic of phosphoric acid catalysts that there is a minimum tendency for oxidation and sulphuration to occur in which cases with a resultant small consumption of valuable material. The proportions of phosphoric acid and absorbent may be varied over any desired range to take care of the need for more or less extensive polymerization and possibly alkylation reactions which may be desirable in the variable mixtures of gases and vapors arising in cracking plant practice.

The foregoing specific examples of reactions in which solid phosphoric acid catalysts of the present character may be employed are given for illustrative purposes and it is to be understood that many other types of reactions could be enumerated and that the invention is not to be limited by the specific cases mentioned.

The following example of results obtained in polymerizing olefinic gases when using catalysts of the type comprised within the scope of the invention is characteristic though a number of others are available.

A catalyst was made by simply mixing 82 parts by weight of 89% commercial ortho phosphoric acid and 18 parts by weight of kieselguhr. The semi-solid mass was heated to approximately 250° C., for a short time after which it was ground and sized to produce particles of from 4 to 10 mesh.

This catalyst was used in a vertical treating tube maintained at a temperature of 350° F., and a gas mixture from the stabilizer of an oil cracking plant (which contained 23% olefins including propylene and higher), was passed downwardly through the catalyst under a pressure of 100 pounds per square inch.

This operation produced 4.5 gallons of gasoline boiling range liquids for each 1000 cubic feet of gas mixture treated. The properties of the untreated product are shown in the following table, the figures being the average for a run of several days' duration.

*Properties of gasoline hydrocarbons*

| | |
|---|---|
| Gravity, ° A. P. I. | 66.5 |
| Initial boiling point | 110° F. |
| 50% over at | 240° F. |
| 90% over at | 430° F. |
| End boiling point | 450° F. |
| Distillation loss | 3.5% |
| Color, Saybolt | 26 |
| Mg. of gum by copper dish | 40 |
| Octane number—research method | 112 |

A light caustic treatment and a distillation to produce 410 end point product gave a gasoline satisfactory in all respects and stable under storage with the addition of 0.01% of a commercial inhibitor consisting of a selected fraction of hardwood tar.

*Example 2*

Pyrophosphoric acid containing between 78% and 79% by weight of phosphorus pentoxide was mixed with a kieselguhr containing 85% silica and 8-9% of moisture removable at 150° C. The proportions by weight were 72% of the acid and 28% of the kieselguhr and the mixing was done at temperatures between 180 and 200° C. Within this temperature range the batches solidified in about 2 minutes after a thorough mixing and they were then removed from the mixer and dried at temperatures from 250-270° C., for times varying between 16 and 24 hours, after which the solid cake was crushed and screened to particles varying from about 10 to 30 mesh. The final analysis of the product showed 63.9% by weight of $P_2O_5$ and 26.8% by weight of $SiO_2$, the remainder being principally water with some very minor percentages of other impurities including metallic phosphates.

The sized particles were charged to a vertical cylindrical treating tower and a mixture of benzol vapors and gases from the stabilizer of an oil cracking plant were passed downwardly therethrough under 50 to 75 pounds pressure after preheating to a temperature of 500° F. The proportion of benzol to stabilizer gas was 6 gallons of liquid benzol to each 1000 cubic feet of gas which contained 18% by volume of propylene and 7% by volume of butylenes.

Substantially all of the propylenes and butylenes were effective in alkylating the benzol under these conditions, the liquid hydrocarbons produced boiling within the approximate range of 150 to 400° F., and having a blending octane number of from 90 to 100 by the motor method. Careful fractionation analyses indicated that there was approximately a 75% formation of mono-alkyl derivatives. The liquid hydrocarbons produced were utilizable directly in gasoline blends after a light caustic wash.

The character of the invention and the marked commercial value thereof can be seen from a consideration of the preceding specification and the single instance of results given but neither is to be considered as imposing corresponding limitations upon the generally broad scope of the invention.

I claim as my invention:

1. A catalyst for polymerizing unsaturated hydrocarbons comprising a mixture of a phosphoric acid and a solid adsorbent, calcined prior to the polymerizing process at between 180° C. and 300° C. without any substantial heating above 300° C.

2. A catalyst for polymerizing unsaturated hydrocarbons comprising a mixture of a phosphoric acid and a siliceous material, calcined prior to the polymerizing process at between 180° C. and 300° C. without any substantial heating above 300° C.

3. A catalyst for polymerizing unsaturated hydrocarbons comprising a mixture of a phosphoric acid and kieselguhr, calcined prior to the polymerizing process at between 180° C. and 300° C. without any substantial heating above 300° C.

4. A catalyst for polymerizing unsaturated hydrocarbons comprising a mixture of a phosphoric acid and adsorbent earth, calcined prior to the polymerizing process at between 180° C. and 300° C. without any substantial heating above 300° C.

5. A catalyst for polymerizing unsaturated hydrocarbons comprising a mixture of a major proportion of a phosphoric acid and a minor proportion of a siliceous material, calcined prior to the polymerizing process at between 180° C. and 300° C. without any substantial heating above 300° C.

VLADIMIR IPATIEFF.